United States Patent [19]
Iwasaki

[11] Patent Number: 5,627,620
[45] Date of Patent: May 6, 1997

[54] PHOTOMETRY DEVICE AND METHOD

[75] Inventor: Hiroyuki Iwasaki, Kanagawa-ken, Japan

[73] Assignee: Nikon Corporation, Tokyo, Japan

[21] Appl. No.: 419,549

[22] Filed: Apr. 10, 1995

[30] Foreign Application Priority Data

Jun. 7, 1994 [JP] Japan ................................ 6-125340

[51] Int. Cl.[6] ........................... G03B 7/08; H04N 9/64; H04N 3/14
[52] U.S. Cl. ........................ 396/233; 348/298; 348/241
[58] Field of Search .................... 354/432; 348/241–245, 348/296–299

[56] References Cited

U.S. PATENT DOCUMENTS

| | | | |
|---|---|---|---|
| 4,422,741 | 12/1983 | Masunaga et al. | 354/403 |
| 5,068,737 | 11/1991 | Taniguchi et al. | 354/400 |
| 5,070,353 | 12/1991 | Komiya et al. | 354/402 |
| 5,083,150 | 1/1992 | Nagasaki et al. | 354/402 |
| 5,126,779 | 6/1992 | Maitani | 354/442 |
| 5,333,028 | 7/1994 | Akashi et al. | 354/402 |
| 5,450,163 | 9/1995 | Iwasaki | 354/432 |
| 5,483,318 | 1/1996 | Hamada et al. | 354/402 |

*Primary Examiner*—Safet Metjahic
*Assistant Examiner*—Michael Dalakis
*Attorney, Agent, or Firm*—Oliff & Berridge

[57] ABSTRACT

An accumulation-type light receiving element photoelectrically converts light from the subject field and outputs an electric signal on the basis of the brightness. An accumulation time setting component sets the accumulation time of the light receiving element and an accumulation operation component carries out accumulation in the light receiving element on the basis of the information from the accumulation time setting component. A photometric value input component inputs the photometry output from the light receiving element. A brightness value calculating component calculates the brightness value of the subject field on the basis of the outputs of the accumulation time setting component and the photometric value input component and further corrects the accumulation time of the light receiving element that has been input from the accumulation time setting component.

22 Claims, 7 Drawing Sheets

PHOTOMETRY DEVICE AND METHOD

FIELD OF THE INVENTION

The present invention relates to a photometry device that is used in a camera or the like, or more specifically, to a photometry device equipped with an accumulation-type light receiving element such as a CCD or the like.

BACKGROUND OF THE RELATED ART

Conventionally, photometry devices of this type include a microprocessor activated by a clock that is generated through a clock generating device. The light receiving element is activated by a clock signal generated within the microprocessor. A photometric signal obtained from the light receiving element is input to the microprocessor, and the brightness value of the subject is obtained through a method that will be described hereinafter.

First, the luminosity L on the light receiving element is calculated through formula 1, based on the output V of the light receiving element.

$$L=V/(S*t) \qquad (1)$$

where V is the output voltage (in units of volts) output from the light receiving element, S is the sensitivity value of the light receiving element (in units of volt/Lux*second), t is the accumulation time given to the light receiving element (in units of seconds), and L is the luminosity (in units of Lux) on the light receiving surface of the light receiving element.

The brightness value BV of the subject field is obtained from formula 2, using a correction coefficient Z (unitless) that is calculated based on the lens data obtained from a lens ROM, the luminosity L calculated by formula 1, and a correction coefficient FO for the beginning diaphragm value (in units of AV).

$$BV=(\log L/\log 2)+Z+FO \qquad (2)$$

where BV is the brightness value (in units of BV) of the subject field.

In addition, there is a method, shown by formula 3, wherein the subject field brightness value BV is directly calculated without calculating the luminosity L on the light receiving element.

$$BV=(\log (V/t)/\log 2)+Z'+FO. \qquad (3)$$

In this case, the correction coefficient Z', which takes into account the sensitivity value S of the light receiving element, is used in place of the correction coefficient Z.

FIGS. 10(a) and 10(b) graphically illustrate the operation of a light receiving element. In the three formulae above, when the graph of the output voltage V is extended in the t=0 direction, as shown in FIG. 10(a), the relationship between the accumulation time t and the output voltage V is assumed and set such that V=0 at t=0.

However, in actuality, an offset voltage V0 arises such that V is not equal to 0 at t=0. This is primarily due to the smear phenomenon.

The smear phenomenon is described in detail below. FIG. 5 illustrates an example of a light receiving element 9 that includes a CCD (i.e., charge-coupled device) area sensor. The portions indicated by the shaded regions are light receiving components (i.e., photoelectric conversion components), which are divided into a plurality of regions. A plurality of H registers (95H-1)–(95H-12) are connected to a single V register, 95V, and the photometric output is transmitted in series from the leading end of the V register 95V. The components other than the light receiving components on the light receiving element 9 (i.e., the components other than those indicated by the shaded regions) are shielded by a material, such as aluminum, to ensure that photoelectric conversion does not occur, even if light from the subject field reaches these components.

However, if a powerful light is incident upon the light receiving element, the light will pass through the shielding material and become photoelectrically converted. This will produce an increase of the apparent accumulation time and will cause the appearance of an offset voltage in the output.

Another phenomenon in which an offset voltage occurs will next be described. FIG. 6 is an enlarged view of the H register component of the light receiving element. In FIG. 6, reference number 91 designates a shutter drain, 92 designates a shutter gate, 93 designates a sensor, 94 designates a lead out gate, and 95H designates an H register.

FIGS. 7–9 diagrammatically illustrate a cross section taken along A-B in FIG. 6. As shown in FIG. 7, prior to accumulation, the shutter gate 92 of the light receiving element 9 is in an open condition (i.e., the low potential condition). The charge generated in the sensor 93 falls to the shutter drain 91 through the shutter gate 92.

Simultaneously with the commencement of the accumulation of the charges, the shutter gate 92 assumes the position shown in FIG. 8, and the charge generated in the sensor 93 begins to accumulate in the sensor 93. When accumulation is finished, as shown in FIG. 9, the readout gate 94 opens, and the charge is conducted to the H register 95H.

Limited time intervals are necessary in the actions of the shutter gate 92 and the leadout gate 94. During these time intervals, a charge is still being generated in the sensor 93. This charge is added to the charge generated during the accumulation time. This appears as the offset voltage.

Since the conventional photometry devices are not made for dealing with these types of phenomena, errors of the magnitude of the offset voltage are introduced into the photometry value.

SUMMARY OF THE INVENTION

In this regard, an object of the present invention is to provide a photometry device that will consider and correct for these offset voltages and thus result in the attainment of an accurate brightness value.

In order to achieve the above and other objects of the invention, and to overcome: the shortcomings in the prior art, the photometry device according to the embodiments of the present invention calculates the brightness value on the basis one an accumulation time for the light receiving element, wherein the accumulation time is corrected to account for the presence of offset voltages. A photometry device in accordance with one aspect of the invention includes an accumulation-type light receiving element that photoelectrically converts light from the subject field and outputs an electrical signal corresponding to the intensity of the light. A brightness value calculating component calculates the brightness value of the subject field and corrects an accumulation time of the light receiving element. Since the accumulation time is corrected and the brightness value of the subject field is then calculated, it is possible to calculate an accurate brightness value for the subject field.

According to another embodiment, the brightness value calculating component calculates the brightness value of the subject field, using a value in which a fixed value has been added to the accumulation time of the light receiving element. Since the brightness value of the subject field is calculated after a fixed value is added to the accumulation time, stabilized correction is possible.

According to another aspect of the invention, the light receiving element operates based on a clock pulse input to the light receiving element, and the brightness value calculating component uses a fixed value according to the period of the clock pulse. Since a fixed value based on the period of a clock pulse is used, an accurate correction is possible even if the period of the clock pulse changes.

According to another embodiment of the invention, the light receiving element generates a base clock pulse that is obtained by dividing the clock pulse, and the brightness value calculating component uses a fixed value according to the period of the base clock pulse. Since a fixed value based on the period of a base clock pulse is used, a more accurate correction is possible.

In accordance with another embodiment of the invention, the light receiving element is equipped with a division ratio changing component that changes the division ratio by which the clock pulse is divided. Since the light receiving element is equipped with a division ratio changing component that changes the division ratio by which the clock pulse is divided, correction based on the division ratio is possible even if the division ratio is changed.

In accordance with still another embodiment of the invention, the brightness value calculating component uses a large fixed value when the period of the base clock pulse is increased. Since a large fixed value is used when the period of the base clock pulse is increased, a correction value can be obtained that is based on the change of the period of the base clock pulse.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Preferred embodiments of the present invention are described hereafter with reference to the drawings.

Figure 1:
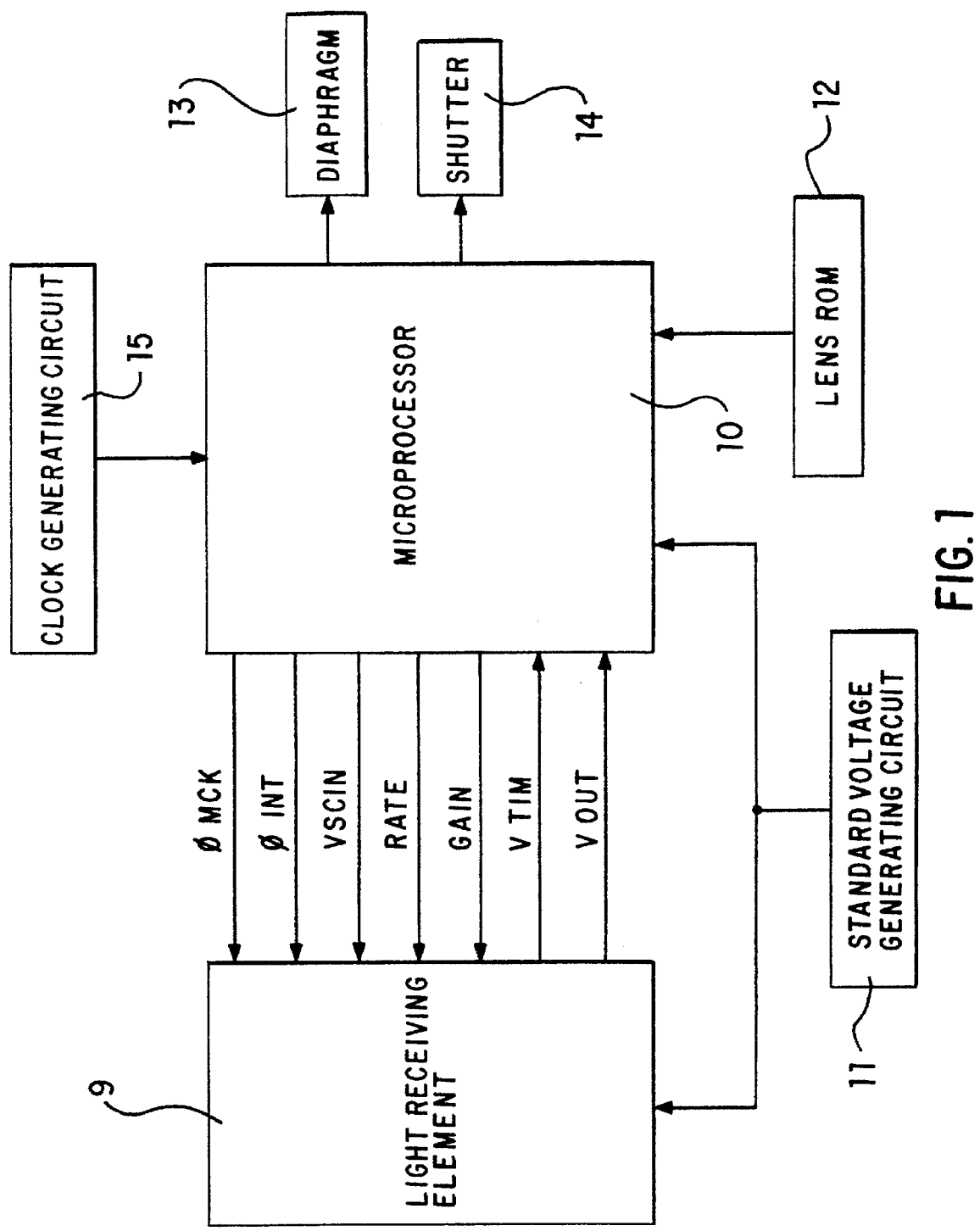
FIG. 1 is a block diagram showing the control structure of an embodiment of the photometry device of the present invention.

FIG. 1 is a block diagram that shows the basic structure of a photometry device according to an embodiment of the present invention.

The microprocessor 10 is a control circuit that controls exposure and the light receiving element 9. A 20 MHz clock signal, which activates this processor 10, is input from the clock generating circuit 15. The microprocessor 10 controls various timers, A/D transformers, serial communication interfaces, reading from and writing to the RAM; and the operation of the input and output terminals. These components are built into the microprocessor and are controlled on the basis of a 10 MHz system clock.

Figure 3:
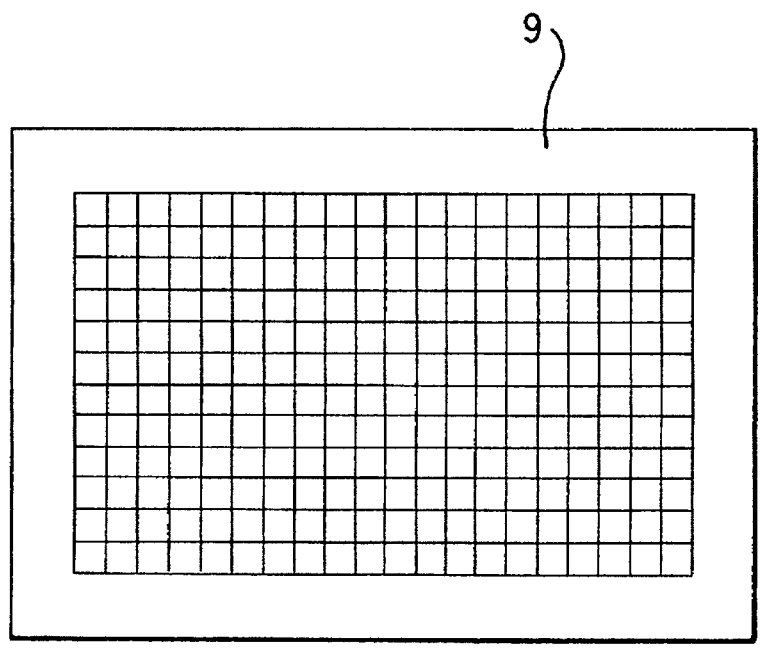
FIG. 3 is a diagram showing the light receiving element of the embodiment of FIG. 1 in the divided condition.

The light receiving element 9 is an accumulation-type element such as a CCD (charge-coupled device) sensor or the like. FIG. 3 illustrates the photometric division state of the light-receiving element composed on the subject field. Photometry is conducted by dividing essentially the entire subject field into 240 regions in a grid 20 units horizontally and 12 units vertically.

A standard voltage is input from the standard voltage generating circuit 11 to the microprocessor 10 and to the light receiving element 9. The light receiving element 9 transmits an output signal according to the electric potential difference from the standard voltage. The microprocessor 10 converts the output signal from the light receiving element 9 into a digital signal through an A/D converter that has the standard voltage as its standard.

The signals that are transmitted from the microprocessor 10 to the light receiving element 9 include a master clock $\phi$MCK, which serves as the basis of the operation of the light receiving element 9; $\phi$ int, which controls the commencement and termination of accumulation; a Vscin signal, which makes initial settings; a rate signal, which changes the ratio of division of the frequency of the master clock; and a gain signal, which changes the gain of the output circuit.

Signals that are transmitted from the light receiving element 9 to the microprocessor 10 include a timing signal Vtim, which incorporates the output signal, and an output signal Vout.

The microprocessor 10 conducts A/D conversion on the voltage of the output signal Vout in synch with the falling edge of the timing signal Vtim and stores the result as the photometry accumulation time t in the RAM. In addition, the microprocessor computes the correction coefficient Z on the basis of information such as the exit pupil distance PO, the focal length f and the aperture stop value FO of the shooting lens. This information is obtained from the lens ROM 12. Furthermore, the microprocessor also computes a brightness value for each division area within the subject field on the basis of the correction coefficient Z and the photometry accumulation time t. The method of computing the brightness value is described below.

The microprocessor 10 uses a commonly known method to calculate the appropriate exposure value on the basis of the calculated brightness value. The microprocessor also controls the diaphragm 13 and the shutter 14 to conduct exposure of the film in accordance with the appropriate exposure value when a signal is detected that indicates complete depression of an unrepresented release button.

Figure 2:
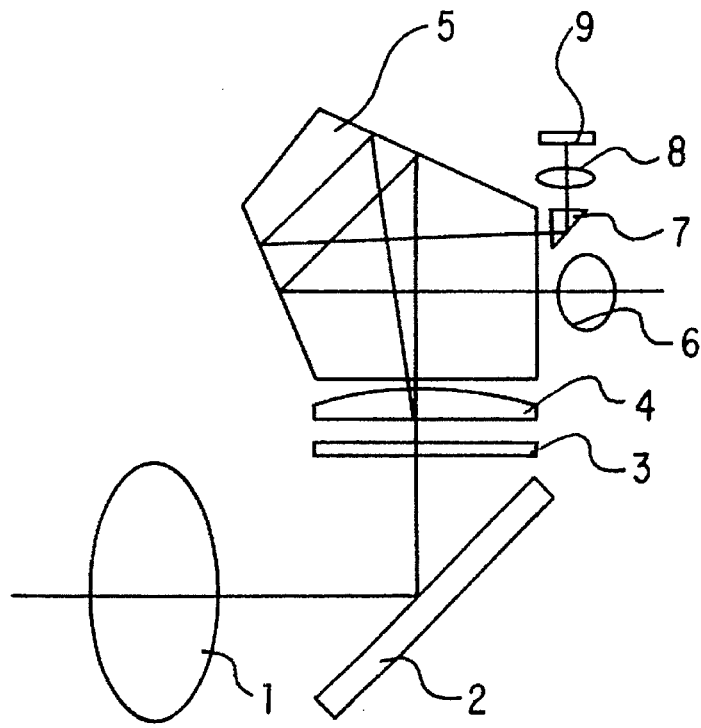
FIG. 2 is a schematic diagram showing the optical system of the photometry device of the embodiment of FIG. 1.

FIG. 2 is a diagram showing the optical system of an embodiment of the present invention. Light rays which pass through the shooting lens 1 also pass through a quick return mirror 2, a diffusion screen 3, a condenser lens 4, a pentagonal prism 5, and an eyepiece lens 6 to reach the eye of the photographer. A portion of the light rays diffused by the diffusion screen 3 passes to the light receiving element 9 through the condenser lens 4, the pentagonal prism 5, the photometry prism 7, and the photometry lens 8.

Figure 5:
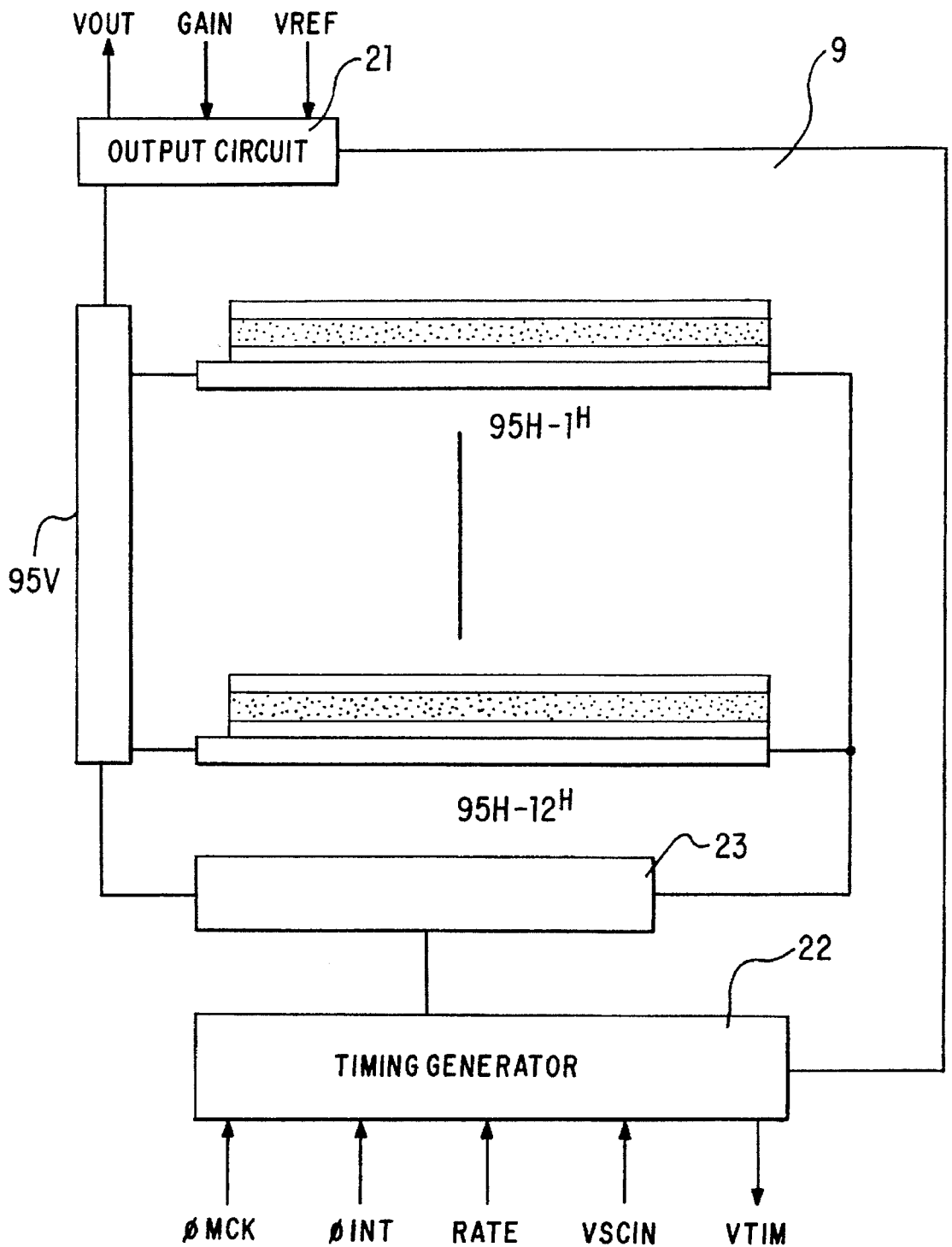
FIG. 5 is a schematic diagram showing the internal structure of the light receiving element.
Figure 6:
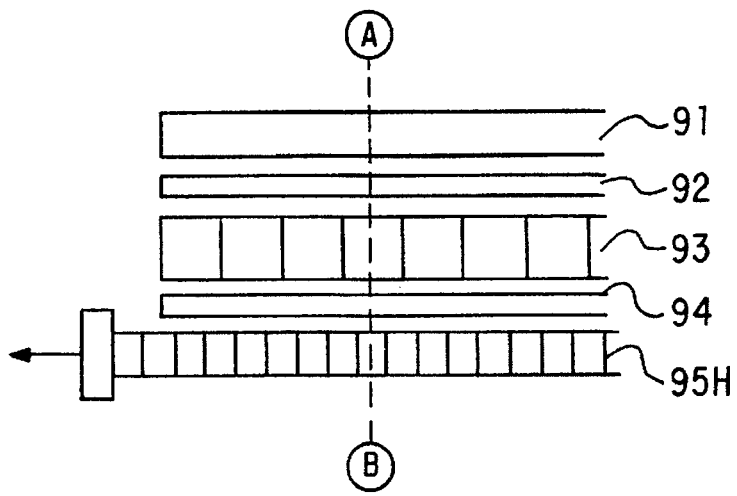
FIG. 6 is a schematic diagram showing the internal structure of an H-register component.
Figure 7:
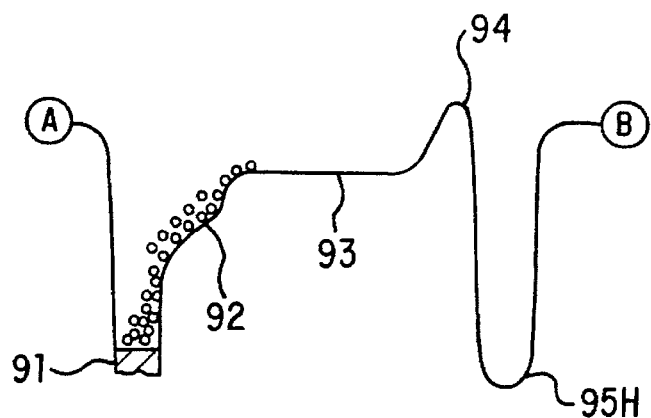
FIGS. 7–9 are schematic diagrams of the H-register during various stages of operation.
Figure 8:
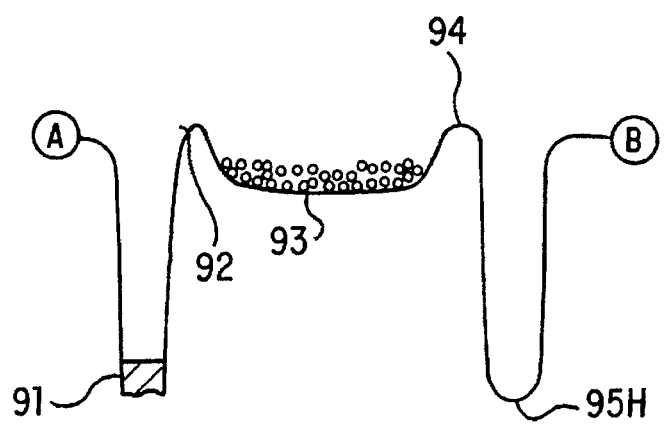
Figure 9:
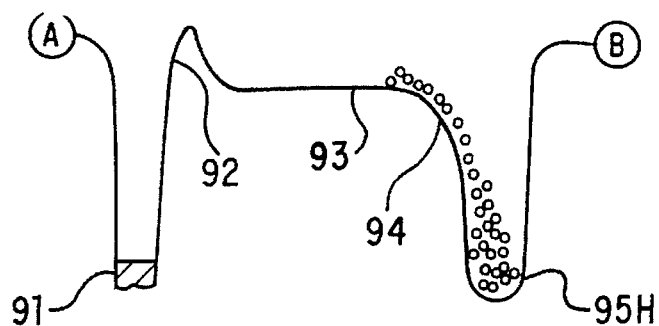
Figure 10A:
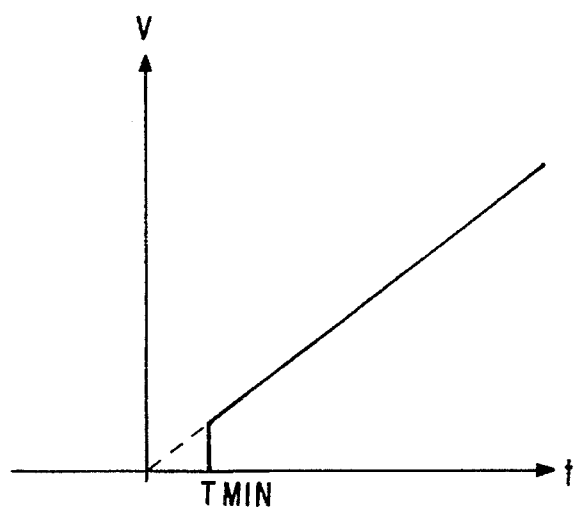
FIGS. 10(a)–10(b) are graphs that illustrate the operation of the light receiving element.
Figure 10B:
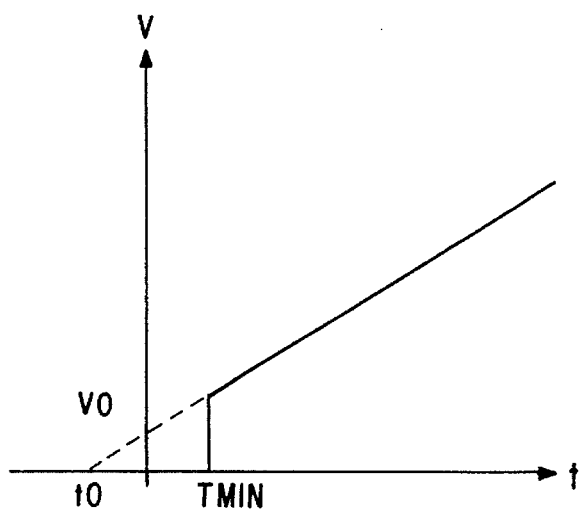

As shown in FIG. 5, in the light receiving element 9, the portions indicated by the shaded regions in the diagram are sensor units. Light rays incident on these units are photoelectrically converted and generate an electric charge. The charge is conveyed to the output circuit 21 via the H registers 95H (95H-1 to 95H-12) and the V register 95V, and the electric potential difference from the standard signal Vref is output from Vout as the output signal.

The gain signal from the microprocessor is input to the output circuit 21. When this signal is High, the amplification of the output circuit is 1. Conversely, when the signal is Low, the amplification is 4. The master clock φMCK, the accumulation indicator signal φint, the rate signal, and the initialization signal Vscin are input into the timing generator 22.

In the timing generator 22, a signal is created that becomes the basis for driving each H register 95H and the V register 95V. A drive signal for each of the registers 95H and 95V is created by the driver 23 on the basis of this signal. In the timing generator 22, a clock signal with a frequency that is the frequency of φMCK divided by 32 is created when the rate signal is HIGH, and a clock signal with a frequency that is the frequency of φMCK divided by 16 is created when the rate signal is LOW. Hereinafter, this clock signal created by the timing generator 22 will be called the base clock.

The initialization signal Vscin is normally High, but drops to Low for a fixed time (approximately 500 times the period of the base clock) when initialization is carried out at the time of connection to an electrical source. At this time, the driver 23 outputs a signal with a frequency 8 times that of the base clock, the residual electric charge in each of the registers 95H and 95V is rapidly expelled, and initialization of the registers 95H and 95V is carried out.

When the initialization signal Vscin is Low, the signal from the output circuit 21 is equal to the standard voltage Vref. The accumulation time of the light receiving element 9 is carried out while φint is in the Low condition. In other words, normally, φint=H, but when accumulation commences, φint is dropped to Low, and accumulation terminates when φint returns to High. The charge is then transmitted by each register 95H.

Figure 11A:
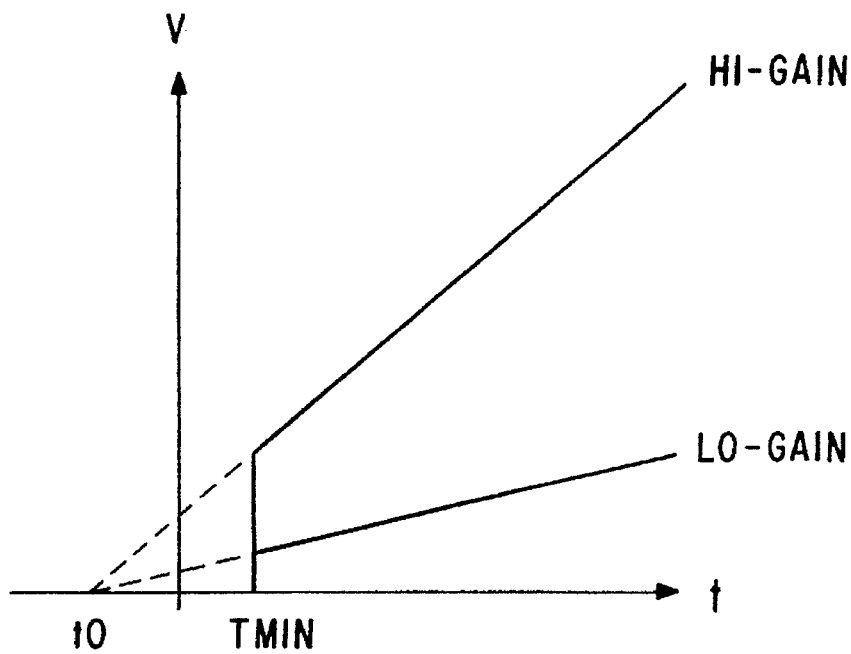
FIGS. 11(a)–11(b) are graphs that illustrate the operation of the light receiving element of the photometry device of the present embodiment.
Figure 11B:
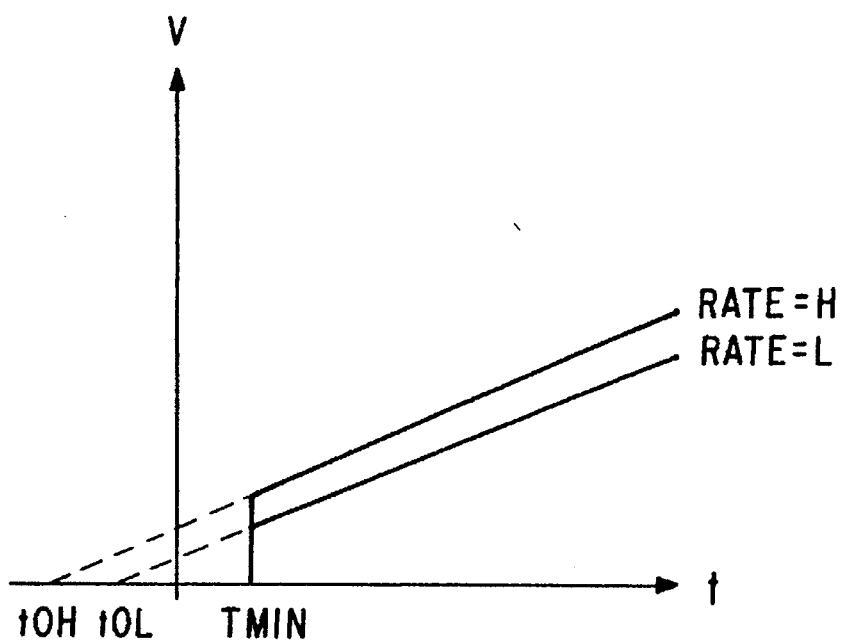

FIGS. 11(a) and 11(b) show the relationship between the accumulation time t and the output voltage V with gain and rate as parameters. Time interval width, tmin, corresponds exactly to the interval of the base clock and is the minimum accumulation interval that can be set for the light receiving element 9. FIG. 11(a) takes gain as the parameter. The distance t0 between the origin and the intersection of the graph and the t-axis is the same, regardless of the amplification rate of the output circuit 21.

However, as shown in FIG. 11(b), t0 is different in the cases where rate=H and rate=L, becoming t0H and t0L, respectively. The primary reason for this difference is that the operating intervals of the shutter gate 92 and the leadout gate 94 during the accumulation action are proportional to the period of the base clock. Since this is described in detail in the descriptions of the prior art, a description is herein omitted.

Figure 4:
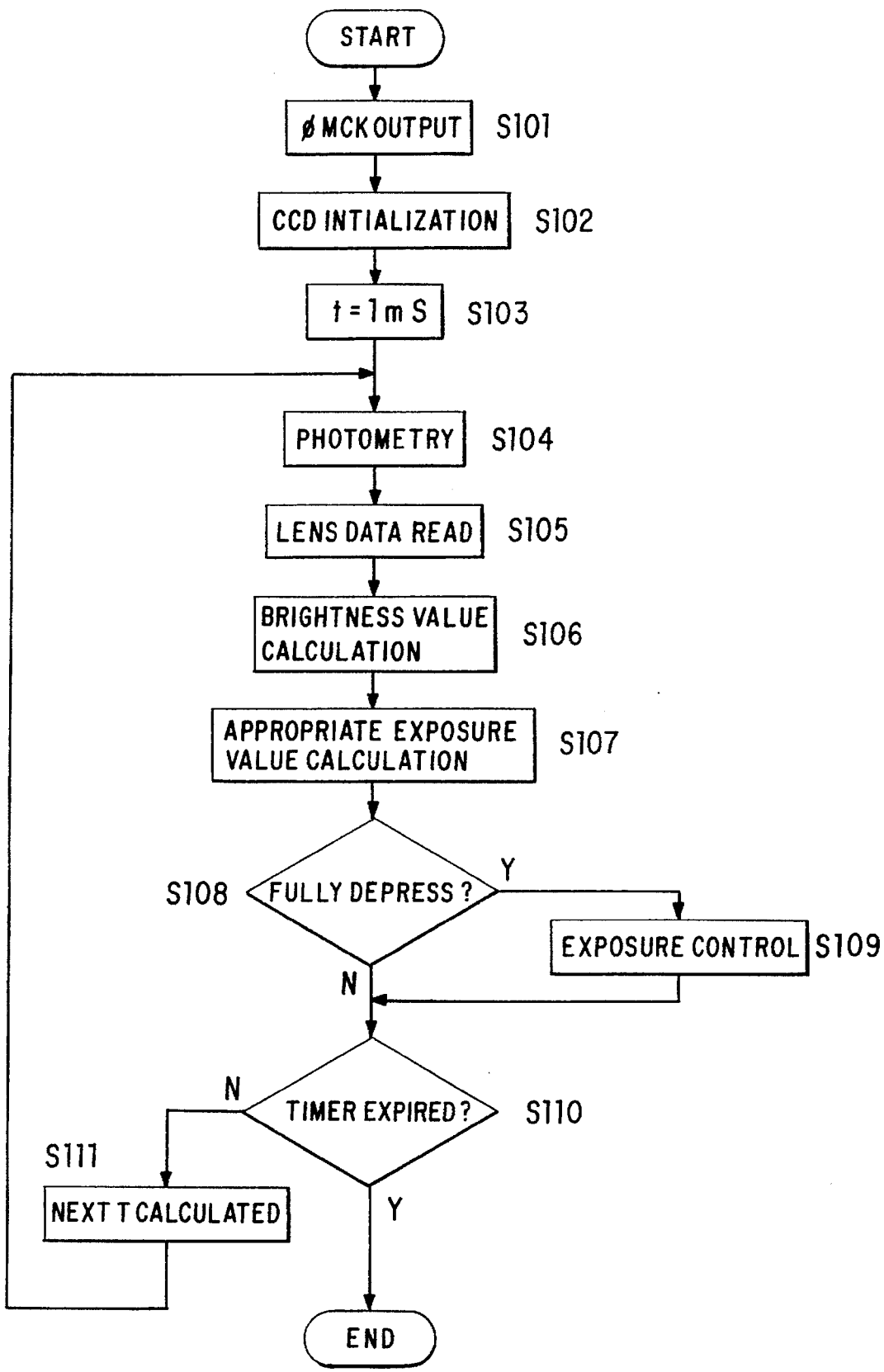
FIG. 4 is a flow chart of the algorithm of the photometry device of the present embodiment.

FIG. 4 is a flow chart that illustrates the algorithm followed by the microprocessor 10.

The algorithm of the microprocessor 10 is started when the electrical source of the camera is connected by a shutter button (not shown) being depressed halfway.

In step S101, φMCK is output. φMCK is 2.5 MHz, which is one-fourth the frequency of the system clock.

In step S102, initializing of the CCD is conducted by Vscin falling to Low for a preset length of time after the settings gain=H and rate=H are made.

In S103, the initial accumulation interval t is set to 1 ms and stored at a fixed address in the RAM within the microprocessor.

In step S104, photometry is carried out through the light receiving element 9 on the basis of the accumulation time t stored in the RAM.

In step S105, the aperture stop value F0, the focal length f, and the exit pupil distance PO of the mounted shooting lens are read out from the lens ROM 12. Based on these values, the photometry correction value Z(i,j) (where i=1,2, ... ,20; j=1,2, ... ,12) for each photometry region is calculated. Z(i,j) indicates the photometry correction data for horizontal address i and vertical address j.

In step S106, the subject field brightness value is calculated for each photometry region using formula 4 below.

$$BV(i,j)=(\log(Vout(i,j)/(t+t0))/\log 2)+Z(i,j)+F0. \tag{4}$$

A time interval corresponding to one period of the base clock is set for the accumulation time correction value t0, but this may be adjusted through experimentation to a more optimum value.

For example, when φMCK=2.5 MHz and rate=H, t0=12.8 μs since the base clock is 78.125 kHz.

When φMCK=2.5 MHz and rate=L, t0=25.6 μs.

When φMCK is changed by the microprocessor 10, t0 is calculated using formula 5 below.

$$t0=32/\phi MCK \text{ (rate=H)}, 16/\phi MCK \text{ (rate =L)} \tag{5}$$

For example, if φMCK=1.25 MHz and rate=H, t0=25.6 μs.

When the brightness value calculation is finished, an exposure calculation is made in S107 using a commonly known method, and the appropriate exposure value is calculated.

In S108, it is determined whether the release button (not shown) has been fully depressed. If the button has been fully depressed, the microprocessor advances to S109, and the exposure is controlled in accordance with the proper exposure value.

In S110, it is determined whether the half-depressed timer has expired. If the timer has expired, the program ends. If the timer has not expired, the next optimum accumulation time is calculated and stored in a fixed address in the RAM in step S111.

The microprocessor then returns to S104 and repeats the same process. The next optimum accumulation time may be set, for example, by the method of Japanese Laid-Open Patent Application J06030329, which is also from the present applicant.

The present invention is not limited to the embodiment described above. Various modifications and alterations are possible. For example, although the invention was described in connection with a single-lens reflex camera, the present invention may also be applied to other devices, such as a lens shutter camera, video camera, or a meter that measures the luminosity of a target region.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A photometry device, comprising:
   an accumulation-type light receiving element that photoelectrically converts light from a subject field and outputs an electrical signal corresponding to the intensity of the light; and
   a brightness value calculating component that calculates a brightness value of the subject field, wherein the brightness value calculating component corrects an accumulation time of the light receiving element to compensate for the presence of any offset voltage at the light receiving element.

2. The photometry device according to claim 1, wherein the brightness value calculating component calculates the brightness value of the subject field using a value in which a fixed value is added to the accumulation time of the light receiving element.

3. The photometry device according to claim 2, wherein the light receiving element operates based on a clock pulse input to the light receiving element, the brightness value calculating component using as the fixed value a value corresponding to a period of the clock pulse.

4. The photometry device according to claim 3, wherein the light receiving element generates a base clock pulse that is obtained by dividing the clock pulse input to the light receiving element by a division ratio, the brightness value calculating component using as the fixed value a value corresponding to the period of the base clock pulse.

5. The photometry device according to claim 4, wherein the light receiving element is equipped with a division ratio changing component that changes the division ratio by which the clock pulse is divided.

6. The photometry device according to claim 5, wherein the fixed value is increased when the period of the base clock pulse is increased.

7. The photometry device of claim 1, further comprising:
   an accumulation time setting component that sets the accumulation time of the light receiving element;
   an accumulation operation component that carries out accumulation of the light receiving element on the basis of information from the accumulation time setting component; and
   a photometry value input component that inputs the electrical signal output from the light receiving element, wherein the brightness value calculating component calculates the brightness value based upon output of the accumulation time setting component and the photometry value input component.

8. The photometry device according to claim 1, wherein the accumulation-type light receiving element is a charge-coupled device.

9. The photometry device according to claim 1, further including an optimization component for calculating an optimum accumulation time.

10. A camera including a photometry device, the photometry device comprising:
    an accumulation-type light receiving element that photoelectrically converts light from a subject field and outputs an electrical signal corresponding to the intensity of the light; and
    a brightness value calculating component that calculates a brightness value of the subject field, wherein the brightness value calculating component corrects an accumulation time of the light receiving element to compensate for the presence of any offset voltage at the light receiving element.

11. A photometry device comprising:
    light receiving means for photoelectrically converting light from a subject field into an electric signal; and
    means, operably coupled to the light receiving element, for calculating a brightness value of the subject field and for correcting an accumulation time of the light receiving element to compensate for the presence of any offset voltage of the light receiving means.

12. The device of claim 11, wherein the accumulation time comprises an accumulation time setting and a correction value.

13. The device of claim 12, further comprising timing generator means for generating clock pulses, wherein the correction value corresponds to one period of the clock pulse generated by the timing generator means.

14. The device of claim 13, wherein the timing generator means includes division ratio changing means for changing a division ratio of a clock signal input into the timing generator means, and wherein the clock pulses are generated on the basis of the input clock signal and division ratio.

15. The device of claim 14, wherein as the division ratio increases, the accumulation correction value decreases.

16. A camera including a photometry device, the photometry device comprising:
    light receiving means for photoelectrically converting light from a subject field into an electric signal; and
    means, operably coupled to the light receiving element, for calculating a brightness value of the subject field and for correcting an accumulation time of the light receiving element to compensate for the presence of any offset voltage of the light receiving means.

17. A method of determining a brightness value for a subject field, comprising the steps of:
    correcting an accumulation time of a light receiving element; and
    calculating the brightness value of the subject field on the basis of the corrected accumulation time.

18. The method of claim 17, wherein the step of correcting an accumulation time comprises the step of adding an accumulation time correction value to an accumulation time.

19. The method of claim 18, further comprising the step of setting the accumulation time correction value equal to one period of a clock signal generated by a timing generator.

20. The method of claim 19, further comprising the step of changing the period of the clock signal.

21. The method of claim 20, wherein the step of changing the clock signal of the timing generator comprises the steps of:
    inputting a master clock signal into the timing generator; and
    dividing the master clock signal by a selected division ratio.

22. The method of claim 21, further comprising the step of decreasing the accumulation time correction value as the division ratio increases.

* * * * *